(12) United States Patent
Goldstein

(10) Patent No.: US 9,282,096 B2
(45) Date of Patent: Mar. 8, 2016

(54) METHODS AND SYSTEMS FOR VOICE AUTHENTICATION SERVICE LEVERAGING NETWORKING

(71) Applicant: Steven Goldstein, Delray Beach, FL (US)

(72) Inventor: Steven Goldstein, Delray Beach, FL (US)

( * ) Notice: Subject to any disclaimer, the term of this patent is extended or adjusted under 35 U.S.C. 154(b) by 0 days.

(21) Appl. No.: 14/475,556

(22) Filed: Sep. 2, 2014

(65) Prior Publication Data

US 2015/0082404 A1    Mar. 19, 2015

Related U.S. Application Data

(60) Provisional application No. 61/872,695, filed on Aug. 31, 2013.

(51) Int. Cl.

| | |
|---|---|
| G06F 21/32 | (2013.01) |
| H04L 29/06 | (2006.01) |
| H04W 4/00 | (2009.01) |
| H04W 4/04 | (2009.01) |
| H04L 29/08 | (2006.01) |
| G06F 17/30 | (2006.01) |
| G10L 17/00 | (2013.01) |
| G06F 21/45 | (2013.01) |

(52) U.S. Cl.
CPC ...... *H04L 63/0861* (2013.01); *G06F 17/30746* (2013.01); *G10L 17/00* (2013.01); *H04L 67/10* (2013.01); *H04W 4/008* (2013.01); *H04W 4/04* (2013.01); *G06F 21/32* (2013.01); *G06F 21/45* (2013.01)

(58) Field of Classification Search
CPC .... G06F 17/30746; G06F 21/32; G06F 21/45
See application file for complete search history.

(56) References Cited

U.S. PATENT DOCUMENTS

| | | | |
|---|---|---|---|
| 5,499,288 | A | 3/1996 | Hunt et al. |
| 5,897,616 | A | 4/1999 | Kanevsky et al. |
| 6,356,868 | B1 | 3/2002 | Yuschik et al. |
| 7,024,359 | B2 | 4/2006 | Chang et al. |
| 7,224,981 | B2 | 5/2007 | Deisher et al. |
| 7,299,177 | B2 | 11/2007 | Broman et al. |
| 7,970,611 | B2 | 6/2011 | Kuppuswamy et al. |
| 8,041,956 | B1 * | 10/2011 | White ............... G06F 21/32 713/186 |
| 8,050,917 | B2 | 11/2011 | Caspi et al. |
| 8,078,463 | B2 | 12/2011 | Wasserblat et al. |
| 8,214,208 | B2 | 7/2012 | Mallett et al. |
| 8,315,366 | B2 | 11/2012 | Basart et al. |
| 8,347,247 | B2 | 1/2013 | Harrington |
| 8,554,562 | B2 | 10/2013 | Aronowitz |

(Continued)

FOREIGN PATENT DOCUMENTS

WO    8605618 A1    9/1986

*Primary Examiner* — Hadi Armouche
*Assistant Examiner* — Ali Shayanfar
(74) *Attorney, Agent, or Firm* — Pablo Meles

(57) ABSTRACT

A method and system for persona authentication includes obtaining from a server a presence list of devices at a location, refining the presence list according to a user profile of the devices thereby forming a dynamic presence list, capturing at least one biometric input from at least one of the devices, authenticating a persona of an individual at the location according to the biometric input and the user profiles in the dynamic presence list, and presenting at least one descriptor of the persona of the individual. In one embodiment, voice authentication uses a centralized voice id database service in conjunction with a Bluetooth 4.0 UUID service to obtain multi-modal biometric user data.

23 Claims, 5 Drawing Sheets

(56) References Cited

U.S. PATENT DOCUMENTS

| | | |
|---|---|---|
| 8,554,563 B2 | 10/2013 | Aronowitz |
| 8,719,019 B2 | 5/2014 | Do et al. |
| 2002/0143540 A1 | 10/2002 | Malayath et al. |
| 2003/0163710 A1* | 8/2003 | Ortiz .................. H04L 63/0861 713/186 |
| 2005/0273339 A1* | 12/2005 | Chaudhari ............. G10L 17/00 704/270 |
| 2006/0212407 A1* | 9/2006 | Lyon ..................... G06Q 20/04 705/71 |
| 2007/0288627 A1* | 12/2007 | Abella ............ H04N 21/64322 709/224 |
| 2009/0018826 A1 | 1/2009 | Berlin |
| 2009/0145972 A1* | 6/2009 | Evans ................. G06Q 20/341 235/492 |
| 2009/0150994 A1* | 6/2009 | Evans ..................... G06F 21/32 726/20 |
| 2010/0097178 A1* | 4/2010 | Pisz ..................... B60R 16/037 340/5.72 |
| 2011/0176667 A1* | 7/2011 | Kumar ............. H04M 3/42042 379/142.04 |
| 2012/0078638 A1* | 3/2012 | Novack ............. G07C 9/00158 704/273 |
| 2013/0144623 A1 | 6/2013 | Lord et al. |
| 2013/0170758 A1* | 7/2013 | G ......................... G06K 19/086 382/218 |
| 2013/0297543 A1* | 11/2013 | Treiser .................. G06Q 30/02 706/45 |
| 2015/0015365 A1* | 1/2015 | Ortiz .................. H04L 63/0861 340/5.53 |

\* cited by examiner

400

METHODS AND SYSTEMS FOR VOICE AUTHENTICATION SERVICE LEVERAGING NETWORKING

CROSS REFERENCE TO RELATED APPLICATIONS

This application is an utility patent application that claims the priority benefit of Provisional Patent Application No. 61/872,695 entitled "Method and System for Voice Authentication" filed on 31 Aug. 2013, the entire contents of which are incorporated herein by reference in their entirety.

FIELD

The present embodiments herein disclosed generally refer to methods and systems for person or persona authentication and localization in conjunction with social networking and social media, and more particularly, leveraging short range networking or protocols such as Bluetooth low energy, near field communication (NFC), and wi-fi networking for purposes of individual authentication and localization.

BACKGROUND

Speech signals include information about the creator of the speech; that is, the person talking. Modern technology known as Speaker ID or Voice Verification can identify the speaker as one of a moderate collection of speakers, or can verify a claimed identity, in a short segment of speech or a collection of such segments. The requirement for such an identification process is that the speech of the person to be identified is available independently of the message.

The term voice recognition or speaker identification refers to finding the identity of "who" is speaking, rather than identifying the content of what they are saying. Recognizing the speaker can simplify tasks of translating speech in systems that have been trained on a specific person's voice or it can be used to authenticate or verify the identity of a speaker as part of a security process.

Biometrics refers to metrics related to human characteristics and traits. Biometric identification (or biometric authentication) is used in computer science as a form of identification and access control based on human characteristics and traits. It is also used to identify individuals in groups that may be monitored or under surveillance. Biometric identifiers are the distinctive, measurable characteristics used to label and describe individuals. Biometric identifiers are often categorized as physiological versus behavioral characteristics.

SUMMARY

Figure 1A:
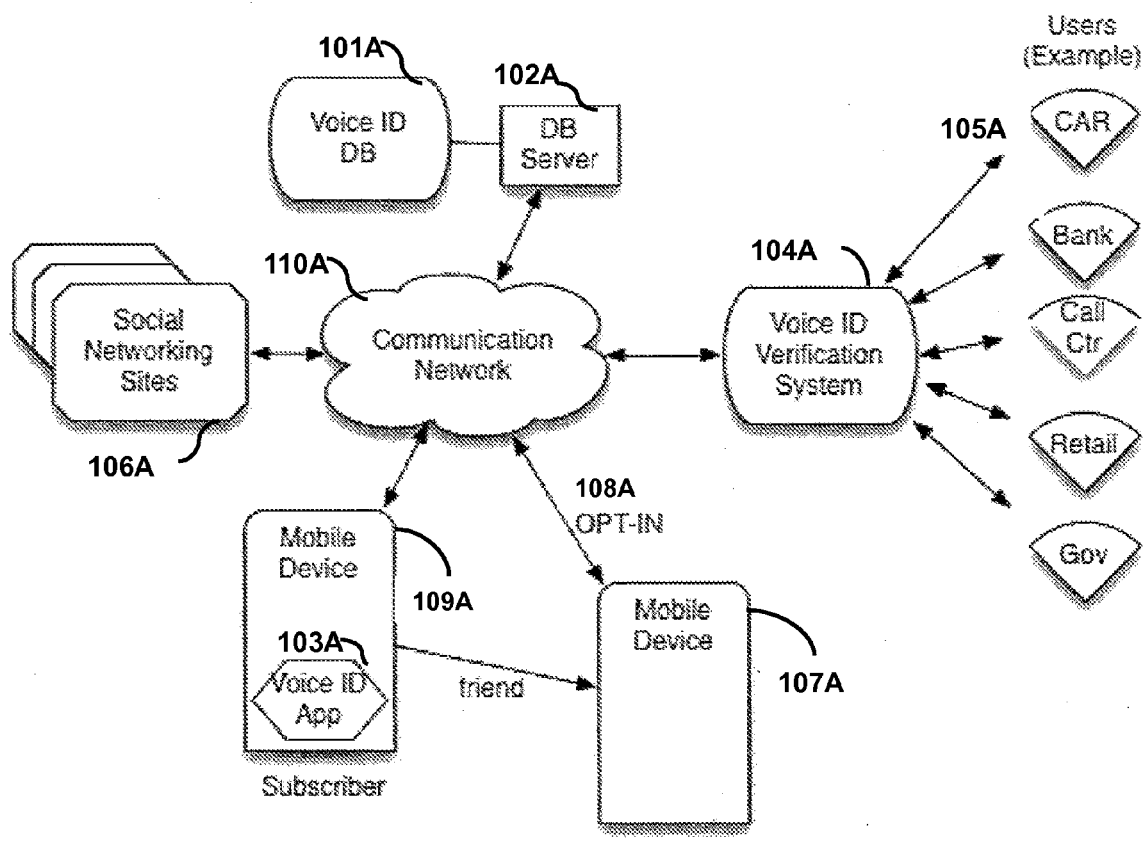
FIG. 1A depicts Voice-ID network functions in accordance with an exemplary embodiment.

In a first embodiment, a method for persona authentication is provided. The method includes the steps of obtaining from a server a presence list of devices at a location, refining the presence list according to a user profile of the devices thereby forming a dynamic presence list, capturing at least one biometric input from at least one of the devices, authenticating a persona of an individual at the location according to the biometric input and the user profiles in the dynamic presence list, and presenting at least one descriptor of the persona of the individual. The biometric input can be a voice sample, a captured image, an iris scan, or a fingerprint. The persona generally means a name, alias, identification, speech pattern, or image associated with the individual on social media, or other public identifier. The descriptor generally means one of a username, login name, public record, a voice sample, or photo, or other personal or private identifier, but can also include associated device identifiers such as WAP addresses, MAC addresses, or International Mobile Equipment Identities (IMIEs).

A presence of one or more local devices used to capture the biometric input can be evaluated in a proximity or a near-field of the user device at the location. Thereafter, one or more of the local devices can be interrogated for local user profiles to assist with the authentication, for example, to determine if a social media or social media site indicates that person may be there, or if a friend list indicates that person may be attending an event at the same location. Social media can include, but is not limited to websites and applications that enable users to create and share content or to participate in social networking. Also note, the local user profile can just include (or be substituted for) a historical relationship between the user and a device and thus only a connection or connection history may be used as (or instead of) the local user profile. The dynamic presence list can be refined during the evaluating and interrogating in accordance with the presence of the one or more local devices. The refining can expand or contract the dynamic presence list as local devices respectively enter or leave the location. For example, a first search is based on individuals in the vicinity according to GPS. That search is then refined to seek individuals on a smaller scale, for example, a friends list. The search can be continually narrowed or modified as social media or other input is received such as a previous communication (or communication history) between users. In some embodiments, the search can be modified based (at least in part) on social media connections that are of varying degrees of relatedness (e.g., primary connections, secondary connections, tertiary connections, etc). Furthermore, local devices or a network in the vicinity can transmit a beacon signal to other local devices that are not listed on the presence list requesting them to enable a short range communication such as a Bluetooth or WiFi communication link.

The method can include capturing a voice sample of the individual or samples of other voices acquired or heard at the location, where the voice sample or voice samples are the biometric input, querying a voice ID database with the user profile or profiles and the voice sample for a voice identification probability match to the persona at the location, and authenticating the individual from the voice identification probability match. As one example, an image, photo or video of the individual at the location is captured, where the image, photo or video is the biometric input. The image is compared to photos having a known association with an individual; for example, a friend picture, or social media picture. The presence server can be queried with the user profile and the image, photo or video for an image identification probability match to the persona at the location, and authenticate the individual from the image identification probability match.

In a second embodiment a system for persona authentication includes one or more devices having at least one sensor for capturing a biometric input, a memory for storing user specific information, and a user interface for presenting at least one descriptor of a persona of an individual associated with the biometric input, a server for storing user profiles created from the biometric input and user specific information, and a presence server or device for maintaining a dynamic presence list of devices at a location, refining the dynamic presence list according to the user profiles on the server as devices respectively enter or leave the location, and authenticating a persona of an individual according to the biometric input and the user profiles in the dynamic presence list. At least one of the one or more mobile devices evaluates a presence of one or more local devices in a proximity or a near-field of the user device at the location, interrogates the one or more local devices for local user profiles, and refines the dynamic presence list in accordance with the presence of the one or more local devices. The refining expands or contracts the dynamic presence list as local devices respectively enter or leave the location.

The interrogating can be performed over a Bluetooth 4.0 UUID information service connection, or over a non-established temporary Bluetooth 4.0 advertisement channel by way of a UUID option for a Bluetooth Low-Energy protocol or other radio frequency links or other short range link. In the case of Bluetooth, packets can be created for transmission over the temporary Bluetooth 4.0 advertisement channel that include one among personal data, a MAC address, an image of a user. In another configuration, the interrogating can be performed using near-field communication (NFC). In both cases, the method for providing localization services can also include measuring a received signal strength (RSSI) to one or more of the local devices over a communication link, and computing a distance estimate to the one or more local devices, where the communication link is Bluetooth, Near Field Communication, or Radio Frequency (RF).

The localization can include triangulating a location to each of the one or more local devices from the signal strength, querying a voice ID database for a potential location and the persona of the individual from social media, and comparing the location with the potential location to validate the authentication of the persona of the individual from the voice sample. Furthermore, a proximity analysis can be conducted to the local devices from the signal strengths received, which can include refining the presence list to include only devices that are in a specified distance range from corresponding distance estimates in view of the proximity analysis based on a voice quality metric, and capturing voice samples (and secondary voices in the local field) from the devices identified in the presence list for ensuring voice quality verification and authentication. The presence list can also be used to expand the field of potential speakers or personas that can be identified by associating others who might be associated (with varying degrees of relatedness) with the primary user. Also, a time stamp can be marked for each one or more voice samples captured from the devices, and the one or more voice samples can be time ordered according to the time stamp. A speech to text conversion of the one or more voice samples is then performed according to the time ordering.

In a third embodiment, a system for persona authentication includes one or more devices having at least one microphone for capturing a voice sample, a memory for storing a user profile and a user interface for presenting at least one descriptor of a persona of an individual associated with the voice sample, a voice ID database for storing voice prints created from the voice sample and user profile, and a presence server for maintaining a dynamic presence list of devices at a location, refining the dynamic presence list according to the voice prints on the voice ID database as devices respectively enter or leave the location, and authenticating a persona of an individual at the location according to the voice print in the dynamic presence list. At least one of the one or more mobile devices can evaluate a presence of one or more local devices in a proximity or a near-field of the user device at the location, interrogate the one or more local devices for local user profiles, measure a received signal strength to one or more of the local devices over a communication link, and compute a distance estimate to the one or more local devices, where the communication link is Bluetooth, Near Field Communication, or Radio Frequency (RF) or other communication protocol. This can include triangulating a location to each of the one or more local devices from the signal strength, querying the server for a potential location and the persona of the individual from social media, and comparing the location with the potential location to validate the authentication of the persona of the individual from the biometric input.

DETAILED DESCRIPTION

The following descriptions of exemplary embodiments are merely illustrative in nature and are in no way intended to limit the embodiments herein, its application, or uses.

Processes, techniques, apparatus, and materials as known by one of ordinary skill in the relevant art may not be discussed in detail but are intended to be part of the enabling description where appropriate, for example the fabrication and use of transducers.

In all of the examples illustrated and discussed herein, any specific values, for example the sound pressure level change, should be interpreted to be illustrative only and non-limiting. Thus, other examples of the exemplary embodiments could have different values.

Note that similar reference numerals and letters refer to similar items in the following figures, and thus once an item is defined in one figure, it may not be discussed for following figures.

Some of the embodiments herein disclosed generally refer to methods and systems for voice identification (ID) and verification in conjunction with social networking and social media for private use cases, commercial business transactions and government use cases.

Whether at business related events (e.g. trade shows, meetings, conferences) or social gatherings (e.g. wedding receptions, party celebrations), situations often arise where people meet for the first time or cannot remember the names of participants they have met before or would like to have more background information of their conversation partners. A need for voice identification in such situations exists, including private use cases, commercial business transactions and government use cases. In other embodiments, virtual models can be used to recognize and identify not only primary voices, but secondary voices in the background. Enhanced recognition capabilities can be achieved using social networks or social media to assist in recognizing voices, personas or speakers in an adjacent field such as an adjacent acoustic field. Knowledge of primary, secondary, tertiary, or other levels of relatedness from a social network can be used to enhance or refine the recognition scope or framework used for searching or identifying speakers or a persona that may be related or have some form of history with a primary user. In addition, the use of tags in social networks or social can be used to further identify or narrow a search for an otherwise potentially unknown speaker or persona.

A method and system is herein disclosed and provided for voice authentication using in some embodiments a centralized voice id database service, and in other embodiments, in conjunction with a Bluetooth 4.0 UUID service to obtain multi-modal biometric user data and location information. The combination of the Voice ID results and multi-modal user data, including location and presence information, allows the system to authenticate the speaker. One objective is the interwork of Bluetooth 4.0 connection functions and data with the method and systems of Voice ID verification herein for the purpose of person authentication and localization. The novel method and system herein provides an ability to localize and authenticate persons through BT 4.0 or WIFI based triangulation in combination with their Voice ID, to authenticate customers at point-of-sale (POS) through their voice ID and BT 4.0 metadata, for example, for the purpose of completing sales transactions, to enable computing devices to react to the presence of an authenticated individual by reorganizing on-screen data representation to reflect the relationship between that person and the data presenting device owner, and to analyze accumulated voice recordings and catalog the content chronologically against a timeline for historic event retrieval. Further the method and systems herein for a Voice ID application to obtain a Voice ID based on online Internet voice channels carried by VoIP protocols, method and systems of a Voice ID application for soliciting and recruiting new Voice ID database members using social media invocations, and method and systems of a Voice ID application of collecting certain Bluetooth 4.0 UUID metadata and offering this data in form of a SDK for use by mobile application developers.

FIG. 1A illustrates a realization of a Voice-ID network system 100 according to an embodiment of the present embodiments. As shown in FIG. 1A, the components of the Voice-ID network include:

- a voice identifier database 101A that contains the Voice IDs of opted in Voice-ID network subscribers,
- a database server 102A that controls the opt-in procedure,
- a communications network 110A,
- a voice ID App 103A that is installed on a mobile device 109A to deliver visual profile information and persona authentication in the vicinity of the device and controls the recording and delivery of voice samples to create voice prints.
- a social media service (e.g., social networking sites or applications) 106A to communicate with other people that in conjunction with the voice identifier database 101A identifies other participants made available via the web or other interconnection means,
- An ID Verification Service System 104A that provides an interface to a multitude of users in need of ID verification 105A
- At least one local mobile device 107A having a microphone and providing an established social media connection (e.g., friend) to the voice ID App 103A

The Voice IDs stored in the voice identifier database 101A are also referred to as voice prints or voiceprints. The voiceprint is an efficient distillation of the speech of a talker which contains information about his or her identity, but which does not necessarily contain information about the content of the speech used to make the voiceprint. The voice prints include 1) a voice sample, for example, a spoken utterance, or phrases, digitally captured and stored on media, 2) a profile associated with the voice sample (described below), and optionally 3) device specific information, for example, a global positioning system (GPS) location, a Wi-Fi network, a MAC address, an IP address, and a unique device identifier, such as provided by the mobile device running the voice ID App 103A.

The profile can include information such as a name, email address, identification number, IP address, vehicle registration plate number, driver's license number, biometric data, face, iris print, fingerprints, or handwriting, credit card numbers, digital identity, date of birth, birthplace, genetic information, telephone number, login name, screen name, nickname, or handle, country, state, or city of residence, age, gender, race, name of a school attended, name of workplace, location of workplace, grades, salary, or job position, or criminal record. The aforementioned list of profile information is not meant to be exhaustive and only provides a sample of the types of information that can be used in the embodiments herein. As discussed later, such profile information can be used to corroborate an identity.

In the modern collection of algorithms for analyzing audio and speech signals, one aspect of the embodiments is a method to identify the talker of any particular utterance, independent of the information contained in the transcription of that utterance. That is, the talker is identified on only the characteristics of that person's voice, and not on the content or phrase of a spoken utterance. Also, in face-to-face interactions with other people the method described herein identifies information about the people whose voice are captured and/or engaging in a spoken interchange (There might be a mix of people, for instance in a conference room which includes people on a speaker phone, or in a conference setting with some people at a remote site). The Voice-ID network system of FIG. 1 obtains in near real-time the ID, profile and personal information of individuals merely by capturing their voice prints. This greatly enhances the ability for people to socialize and interact in a variety of situations.

Another aspect of the embodiments is the building and updating of a large and secure voice identifier database 101 of voice prints through the utilization of social media, and further incorporating the voice prints to enable enhanced social media value and security. The Voice ID database query system consists of a database that contains secured and encrypted voice ID and other profile data for opted-in individuals, an acquisition method for such voice ID and other profile data for individuals through the use of social networking capabilities, an ID verification system that is used both in social networking as well as commercial transactions to deliver the ID of humans based on their voice samples, and a mobile application (referred to as VIDA in the following) to facilitate the recording and translation of voice samples into voice ID data and profile data for the individual recorded, and which provides a visual representation of the data obtained. Once configured, this database allows for a novel ID verification service based on capturing voice samples that benefits a multitude of users ranging from financial institutions to the control of set top boxes and vehicle access, to name a few. The large scale building up of the voice ID entries and the voice identifier database 101A is further achieved through the exploitation of contact and friends lists that are part of social networking or social media. Voice identification is performed through a profile searching of social media. This efficient searching identifies voice samples of unknown talkers through access of contact or friends lists of a device used to capture the voice samples associated with a user of the device by way of the voice print.

The convergence of the social media interactivity and the ability of speaker identification/verification systems offers a unique capability to deliver talker specific information to the listener in many situations. This information can be delivered via visual display, on a cell phone, pad, or computer devices. While Voice ID delivers identification of people with a high degree of probability it may become desirable in certain situations to have certainty in the speaker's identification to a point that the person's voice can be authenticated. For example, in a large meeting room it may be helpful to associate the voice ID of a speaker with the speaker's location in the room to clearly delineate who the ID'ed voice belongs to. In another situation, at the checkout point of a retail store it may be desirable that a customer can authenticate himself or herself just by delivering a voice sample, and thereby complete the payment of the merchandise. Or in a meeting room, when a person approaches another participant the device display can react and adjust social display properties to focus on the approaching person.

The ability to localize other people using Bluetooth 4.0 connectivity data enhances the Voice ID process significantly by increasing matching probabilities and allowing for authentication. This invention is leveraging the capabilities of a Bluetooth 4.0 system to narrow down the search space and to accomplish an accuracy of Voice Identification suitable for authentication. Bluetooth low energy, also known as Bluetooth 4.0 (BT 4.0), BLE, Bluetooth LE, and Bluetooth Smart, is a Bluetooth standard that is designed for ultra-low energy sensors requiring very little power. Some of the Bluetooth low energy devices that are already available include a variety of sports fitness sensors. In some embodiments, Bluetooth 4.0 is used in a meshed network configuration to connected personal communication devices and to exchange certain specific data relating to the owner of the device. This data is used to complement the voice identification process and to achieve authentication quality. In addition, BT 4.0 is used to compute the distance between two nodes based on signal quality (RSSI).

Figure 1B:
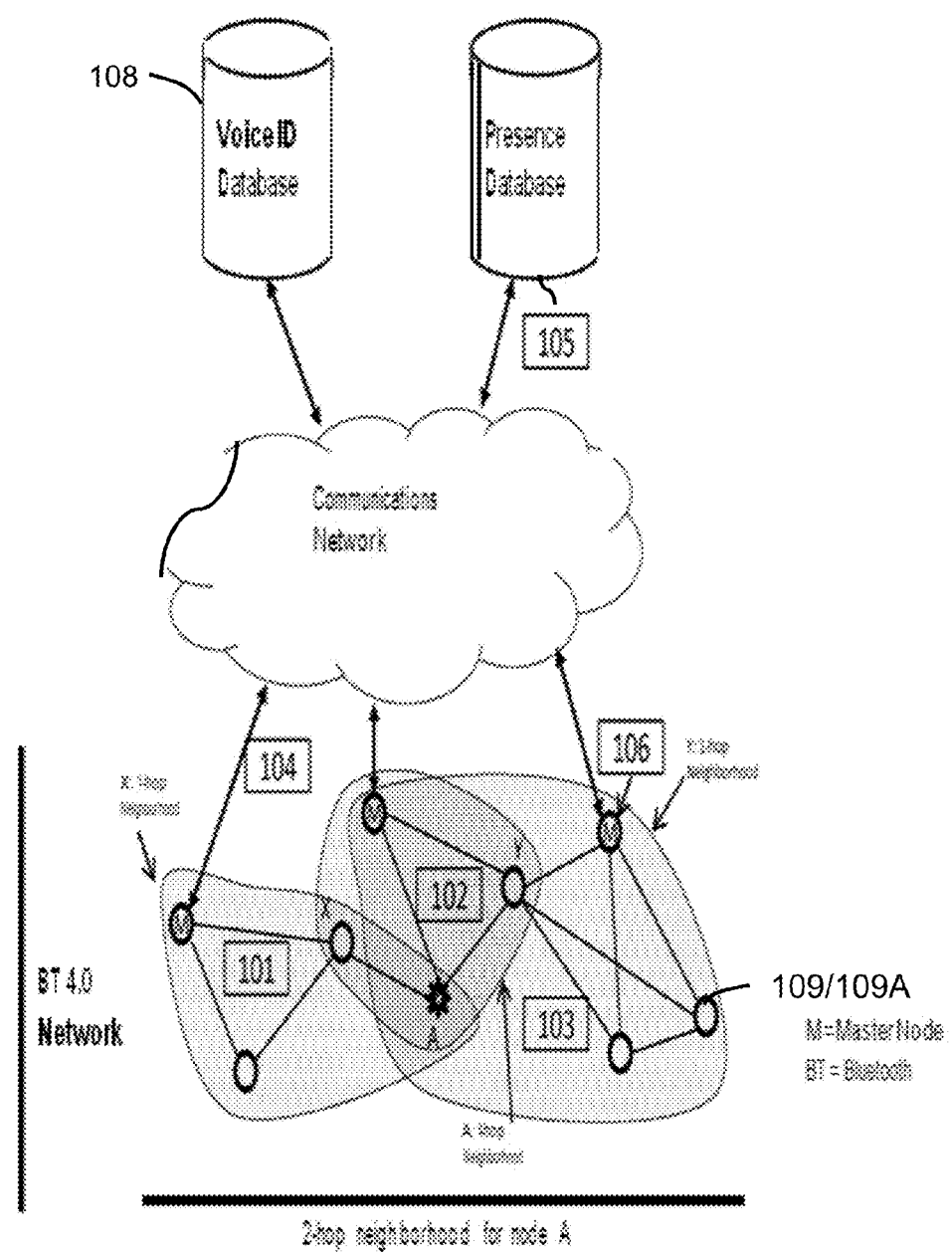
FIG. 1B depicts the Voice-ID network functions of FIG. 1A extended with Bluetooth networking and presence identification in accordance with an exemplary embodiment.

FIG. 1B illustrates a realization of a Bluetooth 4.0 Low-Energy (LE) meshed ad-hoc network system 150 extended from system 100 of FIG. 1A according to an exemplary embodiment. Aspects of the Voice-ID network system 100 contemplated herein, as directed to Bluetooth and localization, extend from the disclose in U.S. patent application Ser. No. 14/466,943 entitled "METHODS AND SYSTEMS FOR A VOICE ID VERIFICATION DATABASE AND SERVICE IN SOCIAL NETWORKING AND COMMERCIAL BUSINESS TRANSACTIONS" filed 22 Aug. 2014, the entire contents of which are incorporated by reference in entirety herein.

As shown in FIG. 1B, the components of the Bluetooth network system 150 include:
  one or more BT 4.0 enabled devices 109 (see also device A) running a Voice Identification Application (VIDA) application and registered as subscribers in the Voice ID database. The Bluetooth devices 109 can also be the mobile devices 109A and 107A shown in FIG. 1A.
  An illustration of I-hop networks (101,102,103) of devices A, X, and Y. The sum of these networks reflect the two-hop network of device A. That is the mobile device A in network group 102 is 2 hops away from either network 101 or 103.
  A set of Master devices 106 (M) that may be selected based on their configuration, battery status, and communication abilities to take on a Master role for recording voice samples and uploading conversations. The master device communicates with the other devices in the group and can also relay data to the communications network 104.
  A presence database 105 that hold information and keeps track of UUID identified BT 4.0 devices.
  A Voice ID database 108 that can identify individuals based on their voice samples received from their communication devices or online Internet Voice communications.

Figure 3:
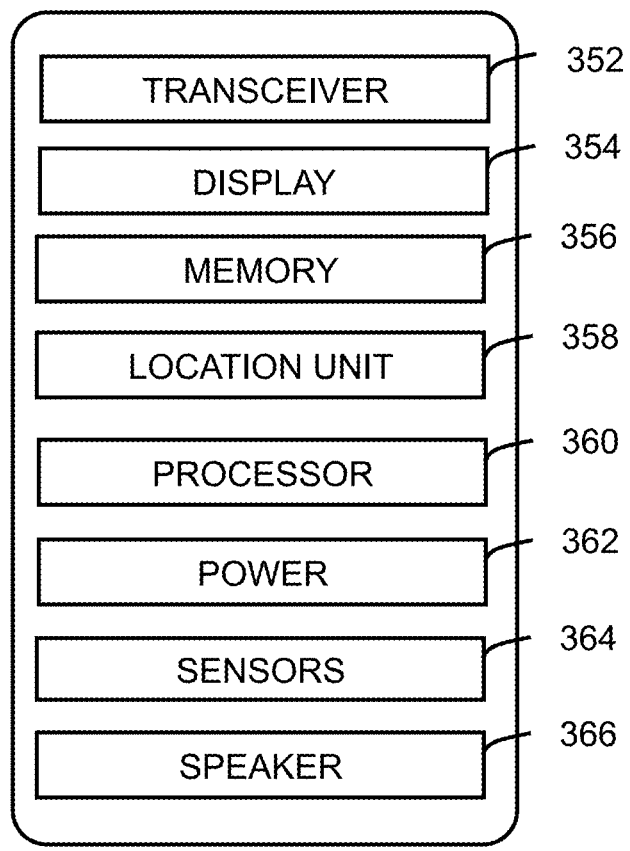
FIG. 3 is an exemplary mobile device for use with persona authentication and localization in accordance with an exemplary embodiment.

The communications network 104 connects the BT 4.0 enabled devices 109 to the supporting databases 105 and 108 for Voice ID verification and presence information, respectively. A detailed description of a mobile device 300, which is similar to the mobile device 109, is shown and described ahead in FIG. 3. Briefly, as shown in FIG. 3, the mobile device 300 includes at least one sensor in the form of a microphone (364) for capturing a voice sample, a memory (356) for storing a user profile and a user interface such as a display (354) for presenting at least one descriptor of a persona of an individual associated with the voice sample. By way of the transceiver 352, the mobile device 109 can also create packets for transmission over a temporary Bluetooth 4.0 advertisement channel that include one among personal data, a MAC address, an image of a user. The mobile device can be interrogated over a Bluetooth 4.0 UUID information service connection, or over a non-established temporary Bluetooth 4.0 advertisement channel by way of a UUID option for a Bluetooth Low-Energy protocol.

As shown in FIG. 1B, each wireless device (also mobile device 109A/108) may be termed as a node (106, 109). A node may communicate with any other node using BT 4.0 methods and protocols. The connections between nodes may form links. The mobile ad-hoc network may include nodes that are mobile (109A/108). In a mobile version of the ad-hoc wireless network 150, routing through network may find the 'best' path to destination including 'multi-hop' relay across multiple wireless nodes. The wireless network is capable of autonomously forming and re-forming links (101, 102, 103) and routes through the network. This dynamic forming and re-forming links and routes may be made to adjust to changing conditions resulting from node mobility. Thus, mobile ad-hoc wireless network's wireless topology may change rapidly and unpredictably. The wireless nodes discover each other by broadcasting a 128 bit UUID as referenced in the BT 4.0 standard as discussed ahead. The communication network 104 couples to the two database services that are available to the mobile devices as shown in the BT 4.0 environment. The Voice ID verification service 108 allows the mobile device to obtain the ID and personal data of an individual based on samples of their voice. Those mobile devices that are registered with this database may take advantage of this service via a mobile Voice ID application (VIDA) installed on their platform. The presence database 105 contains device ID, UUID and personal data of the device user that may have been obtained as metadata through the BT 4.0 discovery process as part of establishing a meshed network embodiment.

The Voice ID (VIDA) mobile application 103A can be installed and executed on the mobile devices 109. Those VIDA enabled devices have the ability to record a voice of an individual and obtain the ID of the speaker through the Voice ID database service 108. In addition, the VIDA application 103A controls the BT 4.0 discovery and connection procedure using broadcasting of and scanning for UUIDs and upon discovery connect to other devices exchanging metadata including but not limited to BT 4.0 MAC address, photographic picture of the device user as well as personal data of the device user. The information obtained is stored in a local presence database on the device reflecting all of the BT 4.0 devices that successfully participated in a pairing procedure, for example, (101, 102, 103). In addition, the presence data may be uploaded to the central presence database 105 thus allowing for sharing of the information with other devices. This sharing may allow a device expanding its presence information to cover a two-hop range of its connectivity.

As illustrated, system 150 includes one or more devices 109 or 300 (shown in FIG. 3) having at least one sensor 364 for capturing a biometric input, a memory 356 for storing user specific information, and a user interface 354 for presenting at least one descriptor of a persona of an individual associated with the biometric input, a server 108 for storing user profiles created from the biometric input and user specific information, and a presence server 105 for maintaining a dynamic presence list of devices at a location, refining the dynamic presence list according to the user profiles on the server as devices respectively enter or leave the location, and authenticating a persona of an individual at the location according to the biometric input and the user profiles in the dynamic presence list. At least one descriptor of the persona of the individual can be presented, for example, showing a picture of the identified individual, or showing information, such as their name, interests, family, hobbies, acquaintances, employer, etc. The biometric input can be a voice sample, a captured image, an iris scan, or a fingerprint. The persona generally means a name, alias, identification, speech pattern, or image associated with the individual on social media, or other public identifier. The descriptor generally means one of a username, login name, public record, a voice sample, or photo, or other personal or private identifier. At least one of the one or more mobile devices evaluates a presence of one or more local devices in a proximity or a near-field of the user device at the location, interrogates the one or more local devices for local user profiles, and refines the dynamic presence list in accordance with the presence of the one or more local devices. The refining expands or contracts the dynamic presence list as local devices respectively enter or leave the location.

The VIDA enabled mobile devices 109A placed in a BT 4.0 network environment continuously participate in and execute a discovery process to detect and connect with neighboring devices (A, Y and X). The devices (see device 109 in 103) are broadcasting a special unique UUID, which can be received and recognized by other BT 4.0 enabled devices (see A; 101, 102). Once recognized the receiving device may compare the UUID to its local presence database. The VIDA enabled mobile devices 109A negotiate and designate certain mobile devices (see M) that are optimally suited to conduct the recordings of the surrounding audio field based on their configuration, battery status. Communication link quality, and signal strength as well as BT 4.0 distance calculation and Near-field communication data (NFC). This can alleviate the computing strain on other mobile devices that are running low on battery and other resources. The designated devices or nodes are referred to as "Master" nodes. The recordings may be uploaded to the Voice ID database 108 and shared with the other nodes indicated on the Master's presence list 105. The selection and designation of devices for audio field recording and cloud communications comprises assessing surrounding devices regarding device configuration, battery status, communication link quality, signal strength, distance from other devices, and Near-field communication data (NFC) and making a decision on which devices are optimally suited for the task.

As shown in the system 150 of FIG. 1B, voice authentication is performed using the centralized voice id database service in conjunction with a novel Bluetooth 4.0 UUID service to obtain multi-modal biometric user data. The combination of the Voice ID results and Bluetooth 4.0 LE obtained multi-modal biometric user data allows the system to authenticate the speaker. In one arrangement, this Bluetooth 4.0 (BT 4.0) information service is based on using a bit UUID in a BT 4.0 meshed network configuration. The BT 4.0 information service leverages the 128 bit UUID option as referenced in the Bluetooth LE standard. This service establishes temporary BT 4.0 connections between devices (109A, 106, 107, 109) that are enabled with the VIDA application 103A, and exchange personal data of the device users including but not limited to the BT 4.0 MAC address of the device, a photo of the device user, and personal data of the device user. Alternatively, in lieu of creating a new BT 4.0 service, the aforementioned personal data of the device users, BT 4.0 MAC address of the device, a photo of the device user, and similar may be added as unique, encrypted sub channel in the BT 4.0 advertisement channel of every device, in addition to the already existing name fields.

In one embodiment, the BT 4.0 enabled devices 109 broadcast a BT 4.0 UUID in the system 150. Other BT 4.0 enabled devices may scan for the UUID and upon recognition may establish a BT 4.0 connection with the broadcasting device. Upon successful connection the UUID associated metadata is extracted, stored in a local presence list. All devices 106 in the BT 4.0 network are treated as BT 4.0 master nodes. Further, the UUID along with the obtained personal user data is uploaded via cloud communications into a central presence database for the purpose of sharing the information with other VIDA enabled devices. The VIDA application 103A may make available access to certain device user data, obtained through the BT 4.0 discovery process, in form of an SDK. Such data may include but would not be limited to Speaker ID, device ID, BT 4.0, MAC address, or similar, for the devices on the VIDA presence list. Mobile application developers may take advantage of this data in building new application Although disclosed as a voice identification system, it should be noted that the system 150 is configurable for other types of biometric identification, and accordingly is not limited to only voice authentication. In such another embodiment, the system 150 is configured for persona authentication. It includes one or more devices (109A, 106, 107, 109) having at least one sensor for capturing a biometric input, a memory for storing user specific information, and a user interface for presenting at least one descriptor of a persona of an individual associated with the biometric input, a server 105 for storing user profiles created from the biometric input and user specific information, and a presence server 108 for maintaining a dynamic presence list of devices at a location, refining the dynamic presence list according to the user profiles on the server as devices respectively enter or leave the location, and authenticating a persona of an individual at the location according to the biometric input and the user profiles in the dynamic presence list. At least one of the one or more mobile devices (109A, 106, 107, 109) evaluates a presence of one or more local devices in a proximity or a near-field of the user device at the location, interrogates the one or more local devices for local user profiles, and refines the dynamic presence list in accordance with the presence of the one or more local devices. The refining expands or contracts the dynamic presence list as local devices respectively enter or leave the location.

The interrogating disclosed above can be performed over a Bluetooth 4.0 UUID information service connection, or over a non-established temporary Bluetooth 4.0 advertisement channel by way of a UUID option for a Bluetooth Low-Energy protocol. In the later, packets can be created for transmission over the temporary Bluetooth 4.0 advertisement channel that includes one among personal data, a MAC address, an image of a user. In another configuration, the interrogating can be performed using near-field communication (NFC). In either case, the method for providing localization services can include measuring a received signal strength to one or more of the local devices over a communication link, and computing a distance estimate to the one or more local devices, where the communication link is Bluetooth, Near Field Communication, or Radio Frequency (RF). This can be achieved by way of the VIDA application 103A to interrogate the strength of the received BT 4.0 LE signal and compute an approximate distance to the broadcasting source of the signal. Devices that have the VIDA application installed may have been previously registered in the Voice ID database via an OPT-IN procedure as described in the referenced patent application.

Figure 2:
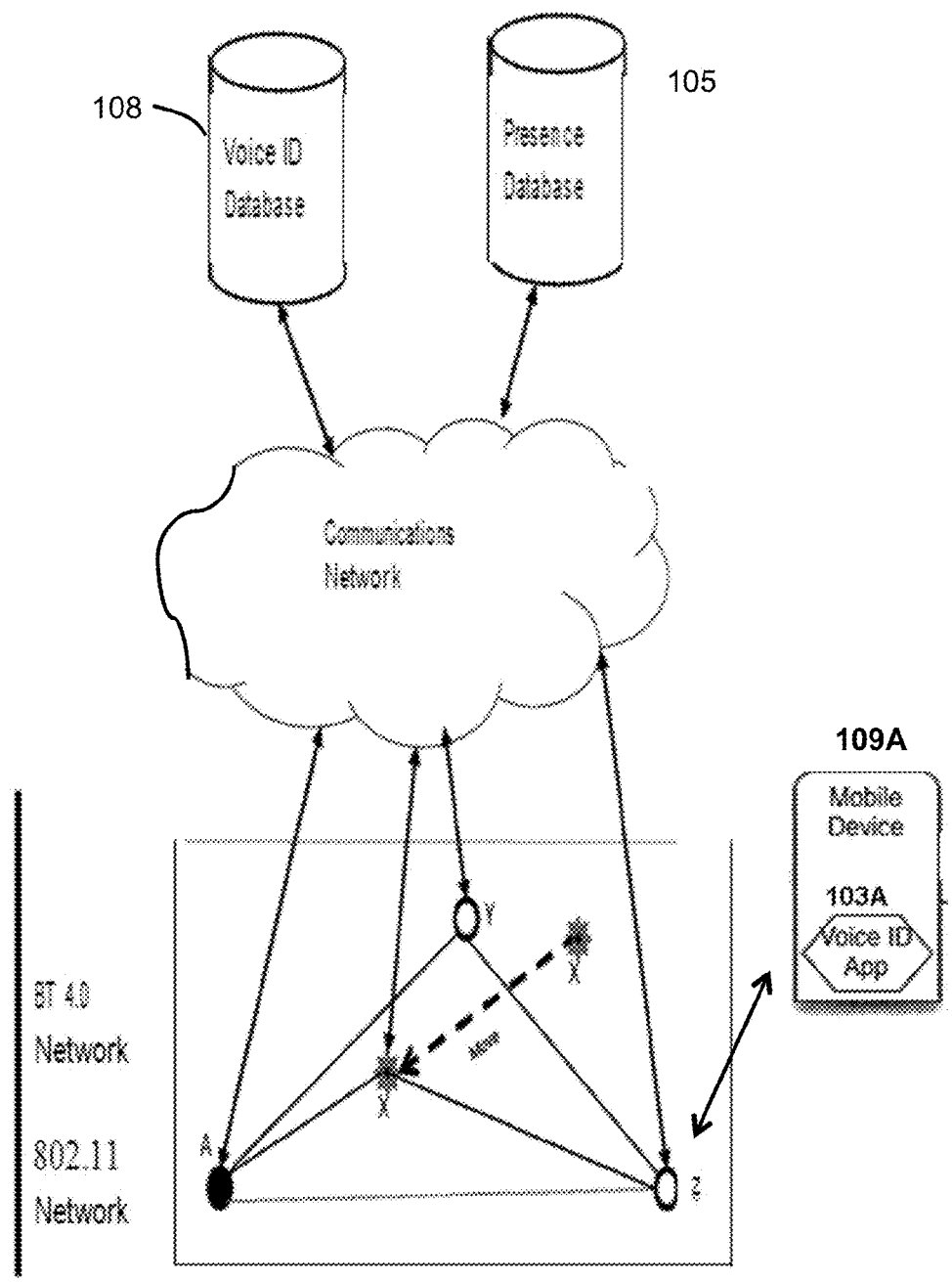
FIG. 2 depicts the method of Bluetooth 4.0 or WiFi triangulation to localize and track people who have been identified through biometric input in accordance with an exemplary embodiment.

FIG. 2 depicts a method of Bluetooth 4.0 or WiFi triangulation to localize and track people who have been identified through their biometric input such as a voiceprint. Recall, one objective achieved herein by way of the method and system disclosed is the interwork of Bluetooth 4.0 connection functions and data with Voice ID verification for persona authentication and localization. For instance, is the person whom the phone is capturing live voice samples from, an individual which the user of the phone knows or is able to infer from social media and established social connections. Aside from social media connections, the method and system herein includes location information to verify or corroborate the biometric input and accordingly the authentication of that person's identify. For example, upon capturing a voice sample, the device checks on a friend list and on social media to assess whether a friend is scheduled to be at an event. The device, or the server, then narrows down the searching of a voice print match to the narrowed presence list identifying which individuals may be present at the location.

For assessing a person's location, the VIDA mobile application 103A in one configuration, measures the BT 4.0 received signal strength and computes an estimate of the distance to the UUID broadcasting BT 4.0 device. By having at least three VIDA enabled devices in 802.11 WiFi or BT 4.0 1-hop proximity, the VIDA application identifies and tracks the location and movement of other devices by means of triangulation. The accuracy of the localization increases with the number of VIDA enabled devices in the proximity. The outcome of the distance/localization calculation is reflected and shown on the presence screens of the devices by centering the display on the device user who may be closest in proximity. As illustrated in FIG. 2, this is achieved from a signal strength measurement to each of the mobile devices (see A, Y, Z), querying the voice ID database 108 for a potential location based on a presence profile maintained in the presence server 105 and the persona of the individual from social media, and comparing the location with the potential location to validate the authentication of the persona of the individual from the voice sample. The VIDA enabled devices 109A may be equipped with a GPS system (see FIG. 4; location unit 358). The on-board device GPS system may be used facilitating the activation and deactivation of the device BT 4.0 and 802.11 WiFi radios upon entering and leaving a building. For example, when entering a building the device 109A may be made aware of this event by its GPS system and may turn on its 802.11 or Bluetooth 4.0 radios. Upon leaving a building the device may turn off its 802.11 or Bluetooth 4.0 radios upon notification by its GPS system indicating re-synchronization with GPS satellites. The decision to turn on or off the 802.11 or Bluetooth 4.0 radios may be overridden by the device user.

A proximity analysis can be conducted to the local devices from the signal strengths received, which can include refining the presence list to include only devices that are in a specified distance range from corresponding distance estimates in view of the proximity analysis based on a voice quality metric, and capturing voice samples from the devices identified in the presence list for ensuring voice quality verification and authentication. The VIDA mobile application 103A conducts the proximity analysis by using the computed distance to other devices, derived from the BT 4.0 received signal strength indicator, and limit its presence list to those devices that are in a specified distance range. This may allow limiting the presence list to those users whose voices can be recorded with sufficient quality for Voice ID verification and authentication. The VIDA application 103A may continually and automatically record the surrounding audio field and upload the recording to a central database according to proximity and location.

Also, a time stamp is marked for each one or more voice samples captured from the devices, and the one or more voice samples can be time ordered according to the time stamp. This may be done by the devices individually or at the server which has group ID and time stamp information available. A speech to text conversion of the one or more voice samples is then performed according to the time ordering. This allows all participants in the area to receive a text of the conversation, with indication of who spoke (voice sample information) and when (a time stamp). In one arrangement, the VIDA mobile application 103A uses a probabilistic anti-model for the purpose of Voice Identification in the processing of voice recordings for speech to text conversion. The probabilistic anti-model for a particular device may be set up in such a way that the voice of the device owner is ID'ed and time stamped as opposed to all other surrounding voices and audio. Applying an user specific probabilistic anti-model to each device in proximity of a device with the device user being the ID'ed and time stamped voice, then the resulting recordings of all devices that are participating in a conversation may be converted to a text file precisely reflecting all parties of a conversation with their time stamps and conversation text. Further, the recorded conversations of said users may be reconstituted to a single audio file composed of the identified and dominant voice segments of each user's recording.

In one arrangement, the VIDA enabled device 103A may solicit and recruit other non-registered devices to join the Voice ID verification network and download and execute the VIDA application. The recruiting includes establishing a Bluetooth connection with the unknown device broadcasting and receiving a BT 4.0 UUID with the Bluetooth MAC address of the unknown device, Interrogating cloud based database services and social media sites to find and match the UUID or BT 4.0 MAC address to a mobile phone number associated with the unknown device, prompting the unknown device to join the Voice ID network via a social media invocation such as a text message or similar including a link to the VIDA application, and using social media to establish a dialog with the user of the unknown device In an exemplary scenario the VIDA enabled devices may establish a connection with the unknown device using BT 4.0 UUID broadcasting and scanning. The received UUID of the unknown device may contain the Bluetooth address of that device. The VIDA application 103A may use the received UUID and Bluetooth 4.0 MAC address to search cloud based database services and social networking sites to match the UUID/MAC address to a mobile phone number. This may require that the user of the unknown device has previously registered his/her phone number with an online service or social media site. Once the search for a phone number is successful the VIDA application may prompt the unknown device to join the network via social media invocation such as text messaging or similar that includes a link to the VIDA application. Agreement to opt-in to the Voice ID network may be given via a special confirmation code or by accepting the download of the VIDA application.

Figure 4:
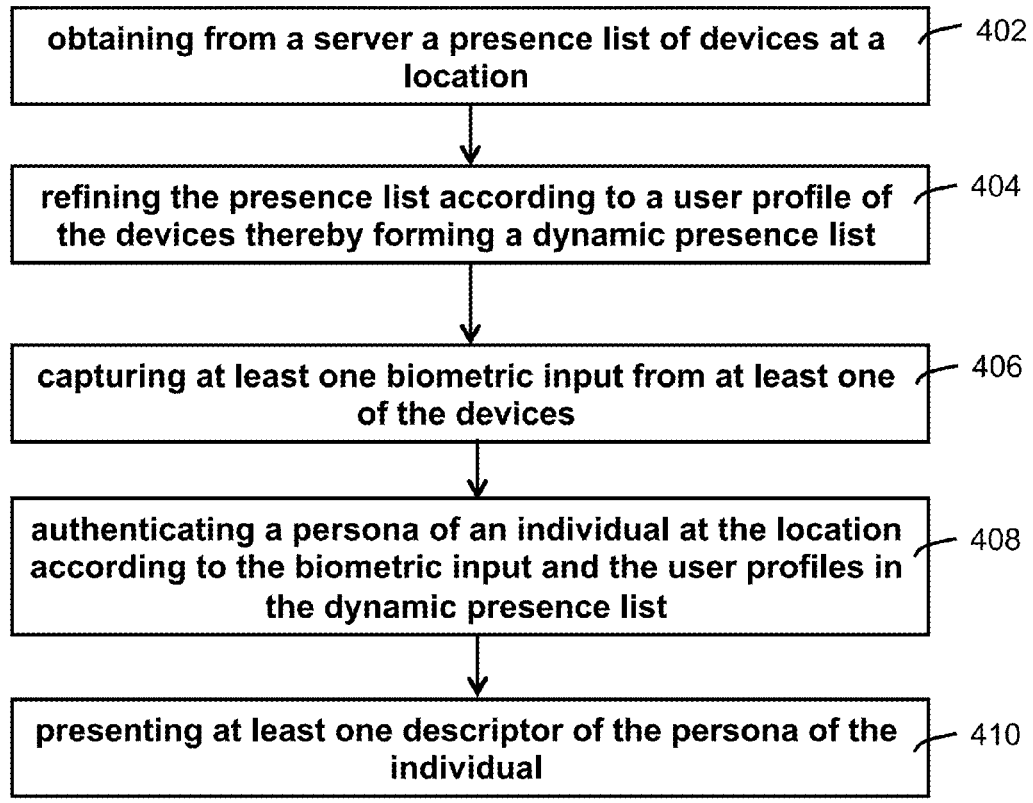
FIG. 4 is a flow chart illustrating a method of persona authentication in accordance with an exemplary embodiment.

FIG. 3 depicts various components of a multimedia device 300 suitable for use for use with, and/or practicing the aspects of the inventive elements disclosed herein, for instance method 400 shown in FIG. 4, though is not limited to only that method or components shown. As illustrated, the device 300 comprises a wired and/or wireless transceiver 352, a user interface (UI) display 354, a memory 356, a location unit 358, and a processor 360 for managing operations thereof. The media device 300 can be any intelligent processing platform with Digital signal processing capabilities, application processor, data storage, display, input modality like touch-screen or keypad, microphones, speaker 366, Bluetooth, and connection to the internet via WAN, Wi-Fi, Ethernet or USB. This embodies custom hardware devices, Smartphone, cell phone, mobile device, iPad and iPod like devices, a laptop, a notebook, a tablet, or any other type of portable and mobile communication device. Other devices or systems such as a desktop, automobile electronic dash board, computational monitor, or communications control equipment is also herein contemplated for implementing the methods herein described. A power supply 362 provides energy for electronic components.

In one embodiment where the media device 300 operates in a landline environment, the transceiver 352 can utilize common wire-line access technology to support POTS or VoIP services. In a wireless communications setting, the transceiver 352 can utilize common technologies to support singly or in combination any number of wireless access technologies including without limitation Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, EDGE, TDMA/EDGE, and EVDO. SDR can be utilized for accessing a public or private communication spectrum according to any number of communication protocols that can be dynamically downloaded over-the-air to the communication device. It should be noted also that next generation wireless access technologies can be applied to the present disclosure.

The power supply 362 can utilize common power management technologies such as power from USB, replaceable batteries, supply regulation technologies, and charging system technologies for supplying energy to the components of the communication device and to facilitate portable applications. In stationary applications, the power supply 362 can be modified so as to extract energy from a common wall outlet and thereby supply DC power to the components of the communication device 300.

The location unit 358 can utilize common technology such as a GPS (Global Positioning System) receiver that can intercept satellite signals and there from determine a location fix of the portable device 300. The controller processor 360 can utilize computing technologies such as a microprocessor and/or digital signal processor (DSP) with associated storage memory such a Flash, ROM, RAM, SRAM, DRAM or other like technologies for controlling operations of the aforementioned components of the communication device.

Referring to FIG. 4, a flow chart illustrates a method 400 of persona authentication in accordance with one of the embodiments herein. The method 400 can include the steps of obtaining from a server a presence list of devices at a location at 402, refining at step 404 the presence list according to a user profile of the devices thereby forming a dynamic presence list, capturing (at step 406) at least one biometric input from at least one of the devices, authenticating a persona of an individual at the location according to the biometric input and the user profiles in the dynamic presence list at step 408, and at step 410 presenting at least one descriptor of the persona of the individual. The biometric input can be, for example, a voice sample, a captured image, an iris scan, or a fingerprint. In some embodiments, the method can include some or all of the steps described above and not necessarily in the order described. In some embodiments, the method can include some or all the steps described above and additional steps such as the additional steps of triangulating a location to each of the one or more local devices from the signal strength, querying a voice ID database for a potential location and the persona of the individual from social media, and comparing the location with the potential location to validate the authentication of the persona of the individual from the voice sample.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

For example, the methods and systems disclosed herein can be extended to build a database (VOICE-ID-database) that contains secured and encrypted voice ID and other profile data for opted-in individuals, an acquisition method for such voice IDs and other profile data for individuals through the use of social networking capabilities, an ID verification system that is used both in social networking as well as in commercial transactions to deliver the ID of humans based on their voice samples, and a mobile application (VOICE-ID app) to facilitate the recording and translation of voice samples into voice ID data and profile data for the individual recorded, and which provides a visual representation of the data obtained. In contrast to existing social media capabilities the embodiments herein provide for the ability to obtain near-real-time information about people who are in close (voice distance) proximity of a communication device that has loaded the aforementioned voice ID application. The combination of the above referenced methods and systems are referred in the following as the VOICE-ID Network. Further note that the VOICE-ID application can obtain such real-time information from not only a single talker in close proximity to a device (having a microphone), but from multiple talkers or voices that are being heard directly or indirectly by the device. The voice or voices captured for comparison with an existing voice print or existing voice prints on the VOICE-ID database can be part of a directed conversation or can also be part of a voice being heard in an ambient space in relative close proximity to the device (that is not necessarily in a directed conversation with the user of the device).

Some embodiments, a method and systems for creating a voice authentication service leveraging an expansive secured and encrypted Voice-ID Verification Database over Bluetooth LE network capabilities in a meshed network configuration with unique UUIDs, includes a. a new unique Bluetooth 4.0 128 bit UUID service implementation with unique metadata for the purpose of Bluetooth 4.0 device pairing and obtaining device identification and biometric user data of the paired device including user name, user pictures, personal data, or similar.

b. an expansion of the BT 4.0 advertisement channel comprising adding personal data of the device users including BT 4.0 MAC address of the device, a photo of the device user, and similar to the BT 4.0 advertisement channel of every device to as unique, encrypted sub channel, in addition to the already existing name fields.

c. the creation of a VIDA service specific Bluetooth 4.0 128 bit UUID designed to carry VIDA specific user data including messages and pointer references.

d. a local presence list in the local memory of each device listing all of the UUIDs of detected neighboring devices along with their metadata obtained.

e. a proximity analysis conducted by a BT 4.0 device to compute the distance to its neighboring devices comprising evaluating the RSSI of the BT 4.0 signal received.

f. limiting the number of entries on the local presence list to those neighboring devices that are closer than a specified distance.

g. Facilitating near real-time authentication of Voice ID and providing profile and personal information of individuals by capturing their voice prints along with their personal data obtained through BT 4.0 UUID metadata h. Supporting a mobile voice ID application (VIDA) executing on a mobile or stationary computing device to facilitate a Bluetooth 4.0 LE network in a meshed network configuration and retrieval of Voice ID.

i. a Bluetooth 4.0 discovery procedure recognizing a unique UUID and associated metadata including a procedure to obtain additional personal data from a central database.

The method can include localizing a node using BT 4.0 or WIFI based triangulation, obtaining the user's Voice ID by querying a central Voice ID database and computing the distance between two nodes based on signal quality. As an example, retail customers at a point-of-sale (POS) station are authenticated from their voice ID along with BT 4.0 metadata.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for persona authentication comprising the steps of:
   obtaining from a server a presence list of devices at a location;
   refining the presence list according to a user profile of the devices thereby forming a dynamic presence list;
   capturing at least one biometric input from at least one of the devices;
   authenticating a persona of an individual at the location according to the biometric input and the user profiles in the dynamic presence list;
   presenting at least one descriptor of the persona of the individual;
   evaluating a presence of one or more local devices in a proximity or a near-field of the user device at the location;
   interrogating the one or more local devices for local user profiles; and
   refining the dynamic presence list in accordance with the presence of the one or more local devices.

2. The method of claim 1,
   where the refining expands or contracts the dynamic presence list as local devices respectively enter or leave the location.

3. The method of claim 2, further including beaconing a request to the local devices that are not listed on the presence list requesting them to enable Bluetooth communication.

4. The method of claim 2, where the interrogating is performed over a Bluetooth 4.0 UUID information service connection.

5. The method of claim 2, where the interrogating is performed over a non-established temporary Bluetooth 4.0 advertisement channel by way of a UUID option for a Bluetooth Low-Energy protocol.

6. The method of claim 5, further including creating packets for transmission over the temporary Bluetooth 4.0 advertisement channel that include one among personal data, a MAC address, an image of a user.

7. The method of claim 2, where the interrogating is performed using near-field communication (NFC).

8. The method of claim 2, further comprising
   measuring a received signal strength to one or more of the local devices over a communication link; and
   computing a distance estimate to the one or more local devices,
   where the communication link is Bluetooth, Near Field Communication, or Radio Frequency (RF).

9. The method of claim 8, further comprising
   triangulating a location to each of the one or more local devices from the signal strength;
   querying a voice ID database for a potential location and the persona of the individual from social media; and
   comparing the location with the potential location to validate the authentication of the persona of the individual from the voice sample.

10. The method of claim 8, further comprising
    conducting a proximity analysis to the local devices from the signal strengths received;

refining the presence list to include only devices that are in a specified distance range from corresponding distance estimates in view of the proximity analysis based on a voice quality metric; and capturing voice samples from the devices identified in the presence list for ensuring voice quality verification and authentication.

11. The method of claim 1, including:

capturing a voice sample of the individual at the location, where the voice sample is the biometric input;

querying a voice ID database with the user profile and the voice sample for a voice identification probability match to the persona at the location; and authenticating the individual from the voice identification probability match.

12. The method of claim 1, including:

capturing an image, photo, fingerprint or video of the individual at the location, where the image, photo, fingerprint or video is the biometric input;

querying a presence server with the user profile and the image, photo or video for an image identification probability match to the persona at the location; and authenticating the individual from the image identification probability match.

13. The method of claim 1, further comprising marking a time stamp for each one or more voice samples captured from the devices;

time ordering the one or more voice samples according to the time stamp; and performing a speech to text conversion of the one or more voice samples according to the time ordering.

14. The method of claim 1, where the persona is a name, alias, identification, speech pattern, or image associated with the individual on social media, and the descriptor is one of a username, login name, public record, a voice sample, or photo.

15. The method of claim 1, wherein the presenting comprises presenting at least one or more of a visual presentation, an audio presentation, or a tactile presentation representative of the descriptor of the personal of the individual.

16. A system for persona authentication comprising:

one or more devices having at least one sensor for capturing a biometric input, a memory for storing user specific information, and a user interface for presenting at least one descriptor of a persona of an individual associated with the biometric input, wherein at least one of the one or more devices are configured to:

evaluates a presence of one or more local devices in a proximity or a near-field of a user device location;

interrogate the one or more local devices for local user profiles; and refine the dynamic presence list in accordance with the presence of the one or more local devices;

a server for storing user profiles created from the biometric input and user specific information;

a presence server for maintaining a dynamic presence list of devices at a location, refining the dynamic presence list according to the user profiles on the server as devices respectively enter or leave the user device location, and authenticating a persona of an individual at the user device location according to the biometric input and the user profiles in the dynamic presence list.

17. The system of claim 16, where the refining expands or contracts the dynamic presence list as local devices respectively enter or leave the location.

18. The system of claim 17, where interrogating is performed over a Bluetooth 4.0 UUID information service connection.

19. The system of claim 17, where at least one of the one or more mobile devices creates packets for transmission over a Bluetooth 4.0 advertisement channel that include one among personal data, a MAC address, or an image of the individual.

20. The system of claim 17, where the biometric input is a voice sample, a captured image, an iris scan, or a fingerprint;

the persona is a name, alias, identification, speech pattern, or image associated with the biometric input on social media; and the descriptor is one of a username, login name, public record, a voice sample, or photo corresponding to the persona.

21. The system of claim 17, where at least one of the one or more mobile devices measures a received signal strength to one or more of the local devices over a communication link;

computes a distance estimate to the one or more local devices, where the communication link is Bluetooth, Near Field Communication, or Radio Frequency (RF), triangulates a location to each of the one or more local devices from the signal strength;

queries the server for a potential location and the persona of the individual from social media; and compares the location with the potential location to validate the authentication of the persona of the individual from the biometric input.

22. A system for persona authentication comprising:

one or more devices having at least one microphone for capturing a voice sample, a memory for storing a user profile and a user interface for presenting at least one descriptor of a persona of an individual associated with the voice sample;

a voice ID database for storing voice prints created from the voice sample and user profile;

a presence server for maintaining a dynamic presence list of devices at a location, refining the dynamic presence list according to the voice prints on the voice ID database as devices respectively enter or leave the location, and authenticating a persona of an individual at the location according to the voice print in the dynamic presence list; and where at least one of the one or more mobile devices:

evaluates a presence of one or more local devices in a proximity or a near-field of the user device at the location;

interrogates the one or more local devices for local user profiles; and refines the dynamic presence list in accordance with the presence of the one or more local devices.

23. The system of claim 22, where at least one of the one or more mobile devices measures a received signal strength to one or more of the local devices over a communication link;

computes a distance estimate to the one or more local devices, where the communication link is Bluetooth, Near Field Communication, or Radio Frequency (RF), triangulates a location to each of the one or more local devices from the signal strength;

queries the server for a potential location and the persona of the individual from social media; and compares the location with the potential location to validate the authentication of the persona of the individual from the biometric input.

* * * * *